June 9, 1925.                                                1,541,654
W. C. O'BRIEN
HITCH FOR ELECTRIC CORDS
Filed Sept. 22, 1923
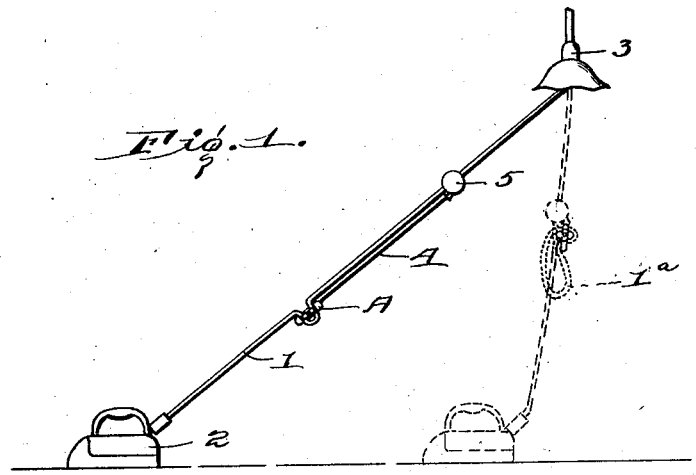
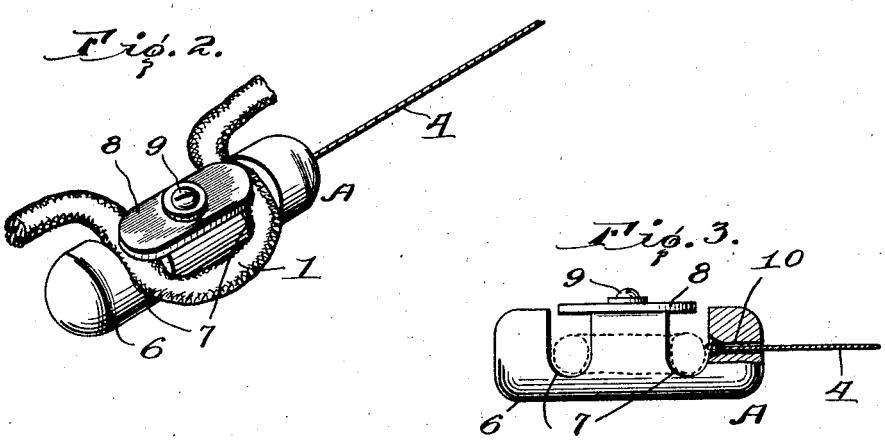
Inventor
William C. O'Brien.
By Robert Watson
Attorney Patented June 9, 1925.

1,541,654

UNITED STATES PATENT OFFICE.

WILLIAM C. O'BRIEN, OF BALTIMORE, MARYLAND.

HITCH FOR ELECTRIC CORDS.

Application filed September 22, 1923. Serial No. 664,280.

*To all whom it may concern:*

Be it known that I, WILLIAM C. O'BRIEN, a citizen of the United States, residing at Baltimore, in the State of Maryland, have invented certain new and useful Improvements in Hitches for Electric Cords, of which the following is a specification.

This invention relates to a hitch for electric cords which may be readily applied to and removed from the cord. The hitch is adapted particularly for use in connection with automatic take-up devices for electric flat iron cords, for taking up the slack in the cord on the backward movement of the iron, such as shown in my copending application, Serial No. 383,953. The hitch comprises a short bar, preferably of wood or fibre, having two spaced notches in one side quite similar to the well known form of "peanut" adjuster for electric cords, but differing from it in that the notches, instead of being contracted at their entrances, are wide enough at their entrances to permit of the free entrance of the electric cord, and a button for locking the cord in place is provided. The hitch is further provided with a cord extending from one of its ends for connecting it to the free running reel of a take-up device.

In the accompanying drawing—

Fig. 1 is a view illustrating the application of the hitch to an electric iron cord, equipped with a take-up device;

Fig. 2 is a prespective view of the hitch connected to an electric cord;

Fig. 3 is a side view of the hitch with the button in closed position; and,

Fig. 4 is a plan view with the button in open position.

Referring to Fig. 1 of the drawing, which illustrates the use of the device, A represents the hitch applied to an electric cord 1, which connects a flat iron 2 with an electric fixture 3, and 4 represents a cord which connects one end of the hitch to the free running spring take-up device 5, the latter attached to the electric cord some distance above the hitch. When the iron is moved backward from the full line position to the dotted line position, the hitch is drawn upward by the take-up and the slack in the electric cord becomes looped, as indicated at 1ª, and when the iron is moved forward this loop straightens out. As flat irons, in household use, are frequently connected to different fixtures, of varying height, it is desirable that the hitch be readily attached to and detachable from the electric cord, to make adjustment for the difference in height of the fixtures, and one purpose of the present invention is to provide a hitch by means of which such adjustments can readily be made.

Referring to Figs. 2, 3, and 4, which show the hitch in detail, 6 represents a short bar, preferably of insulating material, such as wood or fibre, having spaced notches 7 in one side, these notches being of sufficient width to permit of the free passage of the electric cord through the mouths or entrances of the notches. On the side of the bar is arranged a button 8, consisting of a flat strip of wood or fibre, pivoted at its center to the bar midway between the notches by a screw 9. As shown in Fig. 4, when this button is turned crosswise on the bar, it lies between the notches, leaving the notches open for the insertion of the electric cord, and when turned lengthwise of the bar it extends across the notches to hold the cord therein. A hole 10 is bored centrally through one end of the bar to the adjacent notch, and the cord 4, for connecting the hitch to the take-up device, extends through this bore and is knotted at its end to secure the cord to the hitch.

The hitch is simple and inexpensive to manufacture and it will be evident from the foregoing that it may be applied to the cord, easily and quickly, by simply making a bend in the cord, pressing it into the notches, and then turning the button to lock it in place, and that it also may be removed from the cord by turning the button so that it lies crosswise between the notches.

What I claim is:

1. A hitch for electric cords comprising a short solid bar having spaced notches in one side adapted to permit the free entrance of the cord and having an opening extending through one end of the bar to the adjacent notch, said opening adapted to receive an attaching cord, and means on the bar for opening and closing the notches.

2. A hitch for electric cords comprising a short solid bar having spaced notches in one side adapted to permit the free entrance of the cord and having an opening extending through one end of the bar to the adjacent notch, means on the bar for opening and closing the notches, and an attaching cord extending through said opening and knotted to prevent its withdrawal.

In testimony whereof I affix my signature.

WILLIAM C. O'BRIEN.

Attest:
FELIX R. SULLIVAN,
A. BYRON CRISP.